April 30, 1946.   J. R. SNYDER   2,399,515
MULTIPLE QUICK DISCONNECT COUPLING
Filed Oct. 1, 1943   3 Sheets-Sheet 3
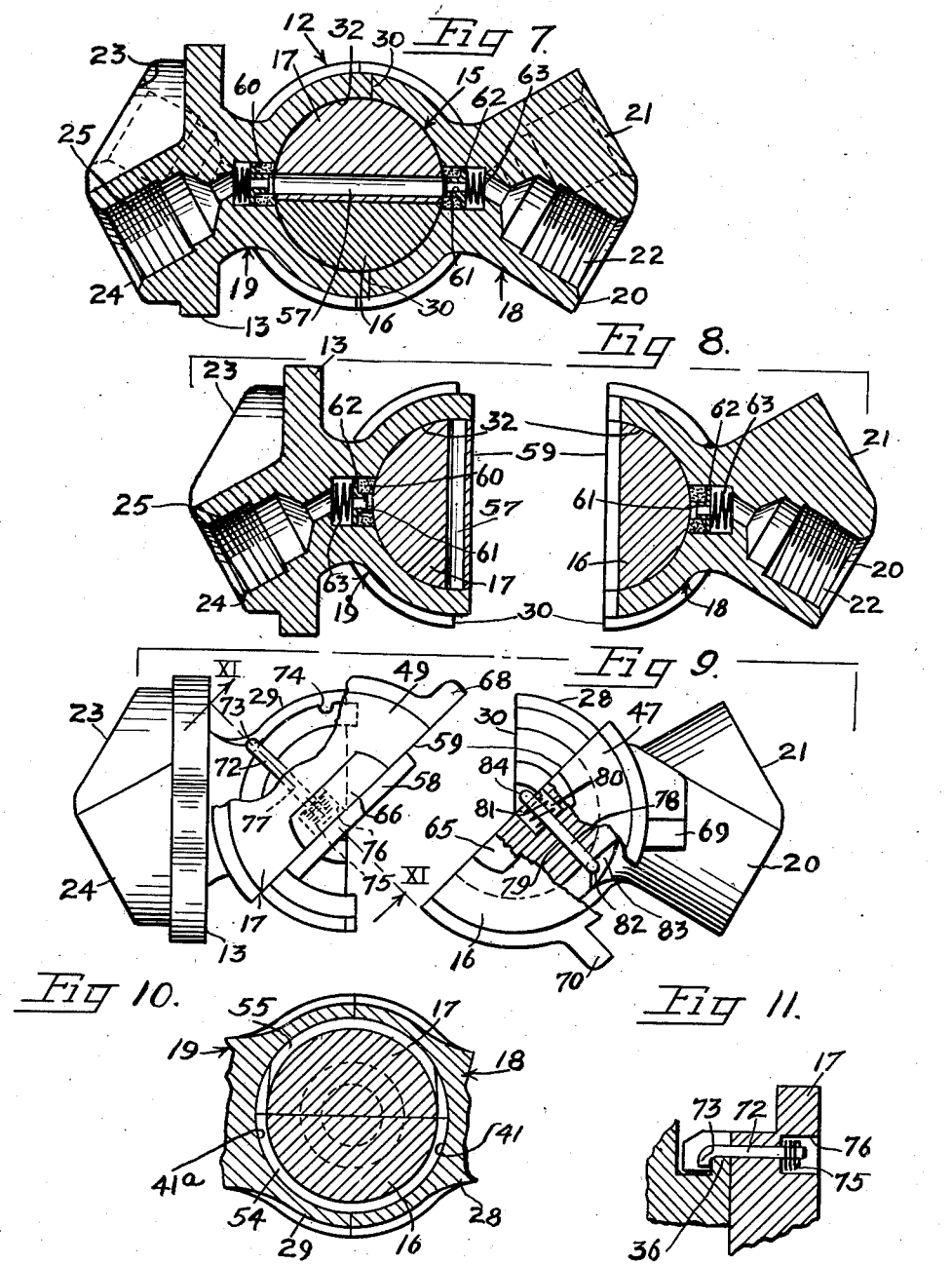
Inventor
JACOB RUSH SNYDER
by Charles W. Hills
Attys Patented Apr. 30, 1946

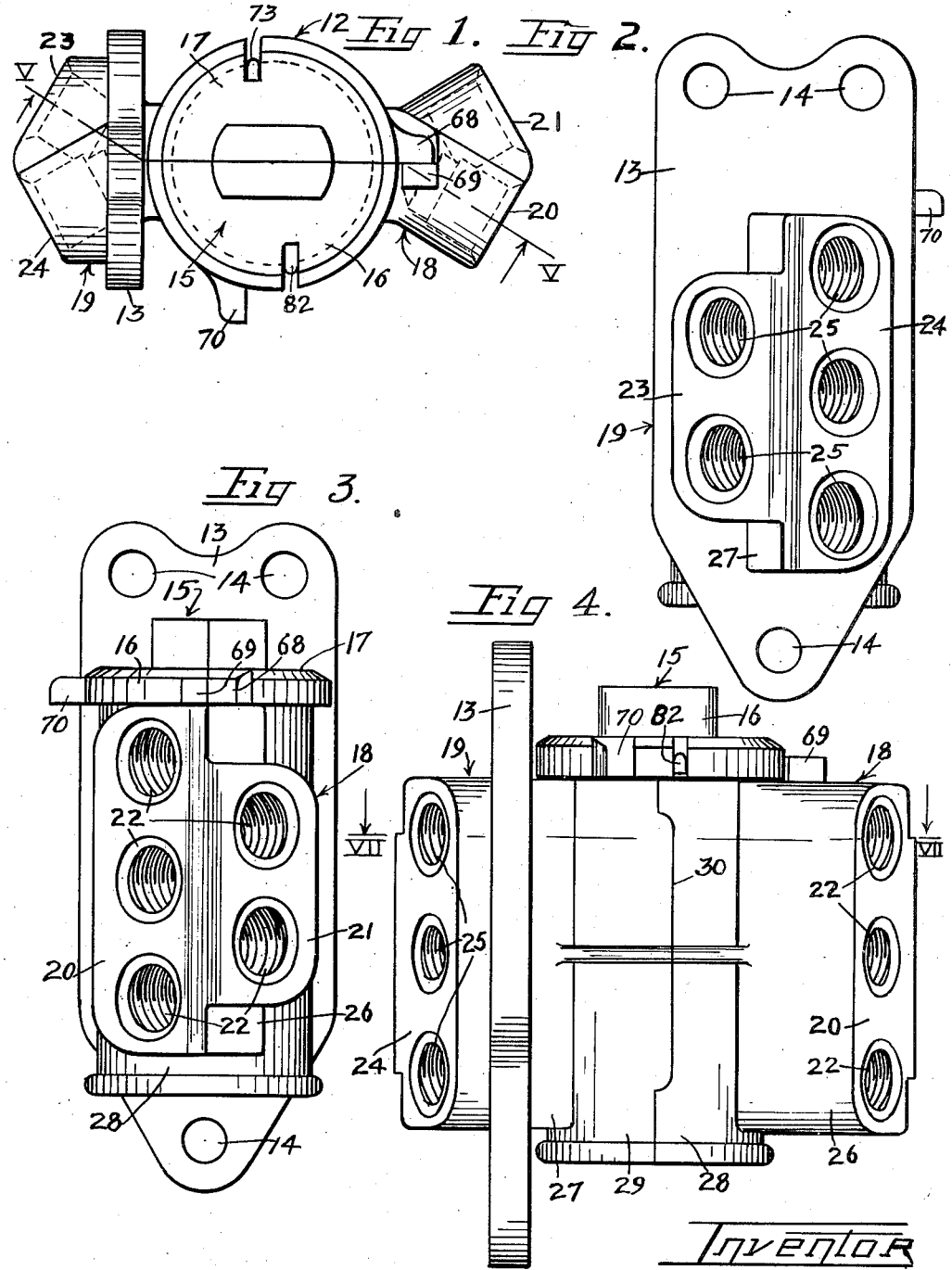

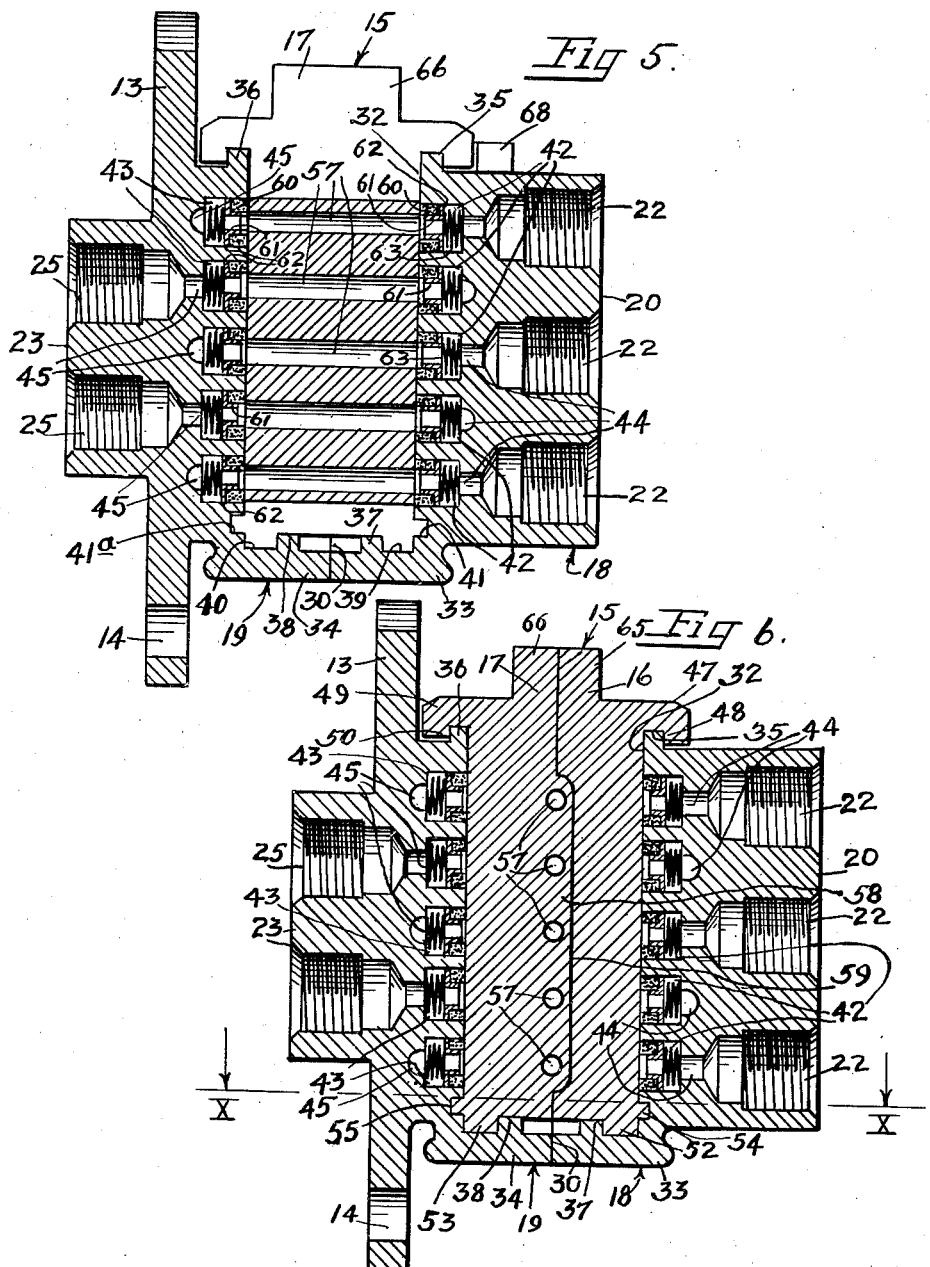

2,399,515

UNITED STATES PATENT OFFICE 2,399,515

MULTIPLE QUICK DISCONNECT COUPLING

Jacob Rush Snyder, Cleveland, Ohio, assignor to Thompson Products, Inc., Cleveland, Ohio, a corporation of Ohio Application October 1, 1943, Serial No. 504,533

1 Claim. (Cl. 284—1)

This invention relates to couplings having a plurality of passages adapted to be automatically sealed whenever the coupling parts are disconnected.

More specifically, the invention relates to a coupling device having a pair of coupling boxes each providing a plurality of ports for individual connection with tubes, pipes and the like and a single split-plug type valve for sealing the ports whenever the coupling boxes are disconnected and for detachably connecting the boxes together by placing the ports of one box in communication with the respective ports of the other box whereby coupling and uncoupling of the boxes is performed by a simple quarter-turn of the plug type valve.

The invention is particularly advantageously adapted for use in the coupling together of fuel, oil, air or water lines serving airplane engines and will hereinafter be specifically described for such use. It should, however, be understood that the coupling devices of the present invention are not limited to any particular use, that shown and described herein being solely for the purpose of illustration.

It is, therefore, an object of the present invention to provide a coupling device having therein a valve for placing a plurality of passages in each coupling part in fluid flow communication while simultaneously locking each of the parts together.

Another object of the present invention is to provide a means whereby a plurality of fluid lines can be interconnected or disconnected as quickly and as effectively as one line can be so handled.

A further object of the present invention is to provide a multiple self-sealing detachable coupling adapted to connect the ends of a plurality of pairs of conduits when coupled together and to seal the ends of each conduit when uncoupled.

It is a still further object of the present invention to provide a multiple coupling unit which will handle as many different types of fluid, at different temperatures, pressure and vacuum conditions as there are lines connected to the same.

It is a further object of the present invention to provide a coupling unit which cannot leak from one line connection to the other, that is to say, if one connection should leak interiorly of the unit, the fluid will be by-passed internally of the device to the outside and not from one line to the other.

Another and still further object of the present invention is to provide a coupling unit which will embody all of the foregoing features and yet will be economical to manufacture and capable of being made on a production basis.

Other and further objects of the invention will be apparent from the following detailed description of the annexed sheets of drawings which, by way of preferred example, disclose a specific embodiment of the invention.

In the drawings:

Figure 1 is a plan view of a preferred type of multiple detachable coupling unit embodying the principles of the present invention;

Figure 2 is an elevation of the coupling unit as seen from the left hand side of Figure 1;

Figure 3 represents an elevation of the coupling unit of Figure 1 from the right side;

Figure 4 is a side elevation of the coupling unit illustrated in Figure 1;

Figure 5 is a vertical section of the coupling unit of Figure 1 as seen from the line V—V therein;

Figure 6 represents a vertical section corresponding substantially to Figure 5 but with the plug disposed at right angles to the position illustrated in the above mentioned figures thereby rendering the two parts of the coupling unit ready for detachment;

Figure 7 is a horizontal cross-section as seen from the line VII—VII in Figure 4 with the several parts exposed in interlocking engagement;

Figure 8 illustrates the type of coupling unit in horizontal cross-section corresponding to Figure 7 but with the plug unit in the position for disengagement of the parts;

Figure 9 represents a plan view of the coupling unit with the parts in disengaged relation and with parts broken away;

Figure 10 is a horizontal cross-section with parts broken away as seen from the line X—X in Figure 6; and Figure 11 is a partial cross-section taken through one of the segments of the coupling shown in Figure 9 and as seen substantially from the line XI—XI therein.

As shown on the drawings:

As will be apparent from Figures 1 to 4, inclusive, of the drawings, the multiple detachable coupling unit 12 of the present invention includes a pair of coupling boxes 18 and 19 with which is associated the valve unit 15 comprising semi-cylindrical parts 16 and 17. The coupling box 19 is provided with a flange 13 apertured as indicated at 14 to receive a plurality of bolts or other suitable fastening means for securing said coupling box to the fire wall or partition forming part of an airplane engine nacelle (not shown). The coupling 12 is usually mounted in such fashion that the box 18 together with the plug 15 will be disposed on the inner side of the fire wall so that only the outer portion of the coupling box 19 will be disposed externally of the nacelle.

The coupling box 18 is provided with angularly disposed faces 20 and 21 in each of which a plurality of ports 22 are located as seen in Figure 4. For the purposes of illustration, five such ports 22 are employed, three being positioned in the face 20 and two in the face 21 in staggered relation so as to permit the grouping of a maximum number of connections in a minimum of space. It will, of course, be understood that any convenient number of ports may be associated with the coupling box 18. Similarly, the coupling box 19 has angularly disposed faces 23 and 24 accommodating therein a plurality of ports 25 also arranged in staggered relation and corresponding generally with the ports 22 of the coupling box 18, (see Figure 2).

All of the ports 22 and 25 are internally threaded and are preferably adapted to taper from the outer end toward the base thereof. Thus, said ports 22 and 25 are adapted to receive in threaded relation therein thimble-type couplings or other suitable fittings applied to the ends of the pipes or tubes which are to be associated with the coupling unit 12 for detachable engagement.

The coupling boxes 18 and 19 are advantageously of generally semi-cylindrical form as will best be seen from Figures 3 and 4 of the drawings. The faces 20 and 21 as well as faces 23 and 24 previously referred to are formed on the portions 26 and 27 of coupling boxes 18 and 19, respectively, said portions 26 and 27 projecting from the generally semi-cylindrical body portions 28 and 29 respectively. The body portions 28 and 29 of coupling boxes 18 and 19, respectively, are adapted to mate as at the joint 30 when said coupling boxes are placed in abutting relation so as to define an open topped closed bottom hollow cylindrical chamber 32 which receives the valve unit 15 composed, as we have seen, of segments 16 and 17, as illustrated in Figures 5 and 6 of the drawings.

The chamber 32 although open at the top is closed at the bottom thereof by the generally semi-circular base portions 33 and 34 of the semi-cylindrical body portions 28 and 29 of the coupling boxes 18 and 19, respectively. The open end of the chamber 32 is provided with an upwardly extending annular rim which is formed by the semi-circular projections 35 and 36 of body portions 28 and 29, respectively. An upwardly projecting annular rib is formed in the base portions 33 and 34 by the cooperation of the generally semi-circular portions 37 and 38, respectively, thereof.

Disposed concentrically and externally of the rib comprising the semi-circular portions 37 and 38 in the base portions 33 and 34 of the body portions 28 and 29 of coupling boxes 18 and 19, respectively, are the arcuate grooves 39 and 40 which cooperate when the coupling boxes 18 and 19 are mated together to form an annular groove. Similarly, semi-circularly shaped grooves 41 and 41a disposed within the chamber 32 and advantageously in close proximity to the base portions 33 and 34 of said coupling boxes 18 and 19, respectively, in which they are formed cooperate when said boxes are mated, to define a generally circular groove extending completely about the inner periphery of said chamber 32.

Also disposed in the internal periphery of the chamber 32 and advantageously arranged one above the other are a plurality of generally cylindrically-shaped bores or chambers 42 and 43 associated with coupling boxes 18 and 19, respectively. Communicating with each of the chambers 42 is a passage 44 which interconnects with one of the ports 22 of the coupling box 18. Similarly, the chambers 43 and ports 25 of coupling box 19 are interconnected by passages 45.

The part 16 of valve 15 disposed in chamber 32 is provided with a generally semi-circular flange portion 47 which is adapted to extend over and ride upon the uppermost edge of the generally circular rim formed by the portions 35 and 36 of the coupling boxes 18 and 19, respectively. A downwardly projecting lip portion 48 formed on and corresponding in shape with flange 47 is adapted to encompass the outer arcuate periphery of the portion 35 of the rim so as to provide cooperative engagement between the segment 16 of the valve 15 and the coupling box 18. The part 17 of the valve 15 is provided with a corresponding flange portion 49 and lip 50 similar to that of the part 16 for cooperative engagement with the portion 36 of the rim forming part of the coupling box 19.

The valve 15 is provided at its base with a generally annular projection made up of the arcuate portions 52 and 53 of the parts 16 and 17, respectively, which are adapted to cooperate with the annular groove formed by the arcuate grooves 39 and 40 in the base portions 33 and 34 of the coupling boxes 18 and 19, respectively. A laterally projecting annular tongue portion is provided adjacent the base of the valve 15 and made up of portions 54 and 55 on the parts 16 and 17, respectively, for engagement with the generally circular groove formed by the cooperating arcuate portions 41 and 41a in the internal wall of the chamber 32 adjacent the base portions 33 and 34 of the body portions 28 and 29 of the coupling boxes 18 and 19, respectively.

This annular tongue portion engaging the groove 41, 41a in coupling boxes 18 and 19 cooperates with the flange portion 47, 49 of the parts 16 and 17 of the valve 15 riding upon the rim 35, 36 encircling the open end of the chamber 32 to support the valve 15 in rotatable relation with respect to said chamber and to enable the parts 16 and 17 to be held in operative engagement with the coupling boxes 18 and 19, respectively, when the coupling unit is disengaged. The portion 55 formed on part 17 of valve 15 which together with portion 54 of part 16 comprises the tongue registering with groove 41, 41a is advantageously not completely semicircular in form to enable the several parts of valve 15 and boxes 18 and 19 to be assembled. The portion 55 is shaped as shown in Figure 10 with its lateral edges substantially tangential to the semi-circular wall of said part 17.

Extending laterally or diametrically of the valve 15 and disposed solely in a projecting portion 58 of the part 17 thereof are a plurality of connecting passages 57. As will best be seen from Figure 6, the several passages 57 which correspond in number to the number of ports 22 and 25 in the coupling boxes 18 and 19, respectively, are arranged one above the other in the projecting portion 58 of the part 17 adjacent the joint between the parts 16 and 17, as indicated by the reference character 59 in Figure 6. These passages 57 communicate with and connect together the several chambers 42 and 43 in the internal wall of the chamber 32 and disposed in coupling boxes 18 and 19, respectively when the valve unit 15 is in the position represented in Figures 5 and 7.

Suitable sealing means are provided in each of the chambers 42 and 43 to enable the prevention of leakage between the several chambers and the corresponding passage 57 in the valve 15 connecting therewith. The sealing means illustrated in Figures 5 and 6 of the drawings comprises generally a sealing or packing ring 60 fabricated from any suitable material such, for example, as cork, rubber, synthetic rubber, neoprene or the like, in the aperture of which is inserted a seal guide 61 which is flanged as at 62 to completely encompass the outermost surface of the packing ring 60. The flange 62 of seal guide 61 provides a contact surface for the spring 63 inserted between said flange and the base of the chamber 42 or 43, as the case may be, to urge the packing 60 firmly against the outer surface of the valve 15 or the part 16 or 17 thereof, as the case may be.

This packing assembly serves, in each case, to prevent leakage between the inner wall of the chamber 32 and the outer surface of the valve member 15 adjacent the passages 57 therein. Moreover, the arrangement of the chambers 42 or 43 and their associated packing assemblies is such as to prevent the possibility of fluid from one of the interconnected series of ports 22 and 25 together with the passage 57 from leaking into any of the other associated ports 22, 25 and passageway 57 in the coupling unit. If any one of the connections should leak as at the chamber 42 or 43, the fluid will simply be by-passed over the external periphery of the valve 15 and cannot combine with or contaminate the fluid in any other of the adjacent passageways or ports.

The operation of the coupling unit of the present invention will best be understood from a reference to Figures 7, 8 and 9 of the drawings. As indicated in Figure 7, the valve 15 is adjusted in cooperative engagement with the coupling boxes 18 and 19 so that the passageway 57 is in communication with chambers 42 and 43 serving the ports 22 and 25 of the coupling boxes 18 and 19, respectively. When it is desired to disengage the coupling boxes 18 and 19, the valve 15 is rotated by the application of a wrench or other suitable tool to the boss made up of the cooperating stud portions 65 and 66 of the parts 16 and 17, respectively, a quarter-turn in a counterclockwise direction from the position illustrated in Figures 1 or 7 of the drawings.

In the original position, the lug 68 formed on the part 17 is in contact with the stop 69 formed on the coupling box 18. By the rotation of valve 15, the lug 70 on the part 16 of said valve now comes in contact with the stop 69. The valve 15 will thereafter be in the position indicated in Figure 6 wherein the passages 57 are disposed substantially at right angles to the chambers 42 and 43 of the coupling boxes 18 and 19, respectively.

Thus, the chambers 42 of the coupling box 18 will be closed by reason of the contact of the arcuate outer surface of the part 16 therewith. The corresponding chambers 43 of the coupling box 19 will be in contact with a similar blank arcuate surface of part 17 of the valve 15. In this position also, the joint 59 in the valve 15 formed between the parts 16 and 17 thereof and the joint 30 formed between the body portions 28 and 29 of the coupling boxes 18 and 19, respectively, will be coincident to each other thereby permitting the coupling boxes 18 and 19 to be disengaged. The part 16 of the valve 15 is thereafter secured to and retained in the coupling box 18 while the part 17 of the valve 15 is secured to and retained in the coupling box 19, as indicated in Figure 8 of the drawings.

To insure against the possibility of the part 16 being shifted with respect to box 18 while the coupling boxes 18 and 19 are disengaged said part is provided with a lock pin arrangement which operates to prevent unauthorized movement of the parts. The locking pin arrangement involving the pin 78 which extends through the substantially radially disposed bore 79 into a cylindrical indentation 80 in part 16 encompassing the spring 81 secured in compressed relation between the fastening on the end of the pin 78 and the base of the indentation 80. When the parts of the coupling unit are disengaged, the pin 78, the downwardly turned portion 82 of which is adapted to slidably engage the outer periphery of the semi-circular rim portion 35, is rendered free to move axially with respect to the bore 79 under the action of the spring 81 so as to expose the end 84 of said pin 78 and to cause the downwardly turned portion 82 to engage a depression 83 formed in the wall of portion 35 and so formed that the part 16 is prevented from being rotated in a clockwise direction as long as the coupling boxes 18 and 19 are disengaged.

The counterclockwise motion of the part 16 will, however, not be restricted by the depression 83 by virtue of the fact that the depression 83 is tapered more gradually from its base toward the outer arcuate surface of the portion 35 in this direction. When the two parts 16 and 17 of the valve 15 are again assembled, the surface of the part 17 at the joint 59 will come in contact with the exposed end 84 of the pin 78 urging it against the pressure of the spring 81 axially outward. The turned down portion 82 of pin 78 will thereafter be prevented from engaging the depression 83 as the valve 15 is again rotated in a clockwise direction to re-establish connection between the passageways 57 and the ports 22 and 25 of the coupling boxes 18 and 19, respectively.

The locking pin 72 associated with the part 17 of the valve 15 has a downwardly turned portion 73 which engages the outer periphery of the semi-circular rim portion 36. Portion 73 of pin 72 is adapted, when the parts are in properly engaged relation and when the lug 68 is in position against the stop 69, to register with a recess 74 being urged into said recess 74 by means of the spring 75 secured in any suitable fashion to the opposite end of the pin 72. Spring 75 is compressed between its fastening on pin 72 and the base of a generally cylindrical indentation 76 in part 17 with which the substantially radially extending bore 77 accommodating the pin 72 in axially slidable relation communicates. This locking pin arrangement is provided to prevent unauthorized rotation of valve 15 when the parts of the coupling are in operating arrangement.

It will, of course, be understood that various details of construction may be varied through a wide range without departing from the principles of this invention and it is, therefore, not the purpose to limit the patent granted hereon otherwise than necessitated by the scope of the appended claim.

I claim as follows:

In a multiple quick disconnect coupling having a pair of complementary semi-cup like coupling boxes, said boxes when abutted together forming a cup and defining a chamber, a longitudinally split two-piece elongated valve rotatable in said chamber, one of said valve pieces having a plurality of spaced transverse passageways therethrough each terminating at opposite sides of the piece, each box having a row of longitudinally spaced port openings in the chamber defining portion thereof, each port opening in one row being paired with a port opening in the other row to register with one passageway only of the valve, and complementary interfitting means at the ends of the valves and boxes coacting to couple the boxes together when the valve is rotated to align the passageways with the port openings and to disconnect the boxes while retaining a valve piece therein when the valve is rotated to cover the port openings, means to connect the port openings of said boxes with conduits comprising a plurality of adjacent rows of hollow nipples projecting from each box, the nipples in adjacent rows being in staggered relation to accommodate large nipple sizes without elongating the boxes, and said boxes having passages extending in angular relation from the ports and joining the hollow interior of each nipple with a port opening whereby a plurality of pairs of conduits connected to the nipples can be placed in fluid flow communication or in disconnected sealed relation by said coupling without requiring a large operating space.

JACOB RUSH SNYDER.